United States Patent
Sato et al.

(10) Patent No.: US 12,427,732 B2
(45) Date of Patent: Sep. 30, 2025

(54) PREPREG CONTINUOUS PRODUCTION DEVICE AND METHOD THEREFOR

(71) Applicant: IHI AEROSPACE CO., LTD., Gunma (JP)

(72) Inventors: Hiroyuki Sato, Tokyo (JP); Yu Shigenari, Tokyo (JP); Tatsuya Kado, Tokyo (JP); Kazuyuki Orihara, Tokyo (JP)

(73) Assignee: IHI AEROSPACE CO., LTD., Tomioka (JP)

( * ) Notice: Subject to any disclaimer, the term of this patent is extended or adjusted under 35 U.S.C. 154(b) by 98 days.

(21) Appl. No.: 17/431,729

(22) PCT Filed: Mar. 27, 2020

(86) PCT No.: PCT/JP2020/014180
§ 371 (c)(1),
(2) Date: Aug. 18, 2021

(87) PCT Pub. No.: WO2020/230464
PCT Pub. Date: Nov. 19, 2020

(65) Prior Publication Data
US 2022/0134688 A1 May 5, 2022

(30) Foreign Application Priority Data

May 10, 2019 (JP) ................................. 2019-089596

(51) Int. Cl.
*B29C 70/50* (2006.01)
*B29C 33/68* (2006.01)
(Continued)

(52) U.S. Cl.
CPC ............ *B29C 70/504* (2013.01); *B29C 33/68* (2013.01); *B29C 70/546* (2013.01); *B29K 2105/0094* (2013.01); *B29K 2105/089* (2013.01)

(58) Field of Classification Search
CPC ... B29C 70/527; B29C 70/524; B29C 70/528; B29C 70/50; B29C 70/504
See application file for complete search history.

(56) References Cited

U.S. PATENT DOCUMENTS 3,616,068 A * 10/1971 Glass .................... B29C 70/504
    156/441
4,574,194 A *  3/1986 Coats .................... G01N 23/16
    378/53
(Continued)

FOREIGN PATENT DOCUMENTS

JP       48-083164       11/1973
JP       58-1726 A        1/1983
(Continued)

OTHER PUBLICATIONS

Huang, Y.D., Y.F. Sun, L. Liu, Beta ray monitoring technique for control of resin content in continuous fibre prepreg materials, Materials Science and Technology, vol. 19 (Jun. 2003), pp. 815-818. (Year: 2003).*

(Continued)

*Primary Examiner* — Matthew J Daniels
(74) *Attorney, Agent, or Firm* — Volpe Koenig

(57) ABSTRACT

Produce prepreg with a matrix resin adhering to the cloth. Arranging a release sheet on each surface of the cloth; passing the cloth and a pair of the release sheets through a gap portion positioned in a clearance of a pair of heating rollers to be overlaid on each other and supplying the matrix resin to be accumulated above the gap portion of the heating rollers and between the pair of release sheets; and adjusting (Continued)

an interval of the pair of heating rollers to thereby control an adhesion amount of the matrix resin.

9 Claims, 7 Drawing Sheets

(51) Int. Cl.
*B29C 70/54* (2006.01)
*B29K 105/00* (2006.01)
*B29K 105/08* (2006.01)

(56) References Cited

U.S. PATENT DOCUMENTS

| | | | |
|---|---|---|---|
| 5,141,583 A * | 8/1992 | Held | B32B 38/08 425/371 |
| 5,234,757 A * | 8/1993 | Wong | B29B 15/122 428/313.5 |
| 2012/0251823 A1 | 10/2012 | Maldonado et al. | |
| 2016/0303777 A1 * | 10/2016 | Miyauchi | B29B 15/122 |

FOREIGN PATENT DOCUMENTS

| | | | | |
|---|---|---|---|---|
| JP | 2001-269954 | * | 10/2001 | B29C 43/28 |
| WO | 2010/150022 A1 | | 12/2010 | |

OTHER PUBLICATIONS

Translation of JP-H02165808-A to Okitani published Jun. 26, 1990. (Year: 1990).*
JP Office Action, Notice of Reasons for Refusal, Application No. 2019-089596, Feb. 18, 2021, 13 pgs.
Extended European Search Report issued on May 27, 2022 for European Patent Application No. 20805329.8.

* cited by examiner

PREPREG CONTINUOUS PRODUCTION DEVICE AND METHOD THEREFOR

TECHNICAL FIELD

The present invention relates to a prepreg continuous production device and a method therefor by a hot melt method.

BACKGROUND ART

The prepreg is a plastic molding material obtained by impregnating a fibrous reinforcement material, such as glass cloth or carbon fibers (hereinafter referred to as "fibrous base material"), with resin, and then heating or drying the resultant fibrous base material into a semi-cured state. For example, in producing an FRP containing fibers and resin, the prepreg is required as an intermediate material thereof. For the fibrous base material of the prepreg, cloth, such as a woven fabric, is used, for example.

When the viscosity of the resin is high, the resin does not soak into the fibers, and therefore the prepreg production requires a step of reducing the viscosity of the resin. In general, examples of a method for producing the prepreg include a hot melt method and a solvent method.

The hot melt method includes placing a sheet-like fibrous base material between release paper sheets, to which a matrix resin has been applied, and then heating them in an overlaid state to thereby reduce the viscosity of the matrix resin and impregnate the fibrous base material with the matrix resin.

On the other hand, the solvent method includes adding a solvent to the matrix resin to reduce the viscosity of the resin, and then impregnating the fibrous base material with the resultant resin, and then evaporating the solvent using a dryer or the like.

The method for producing the prepreg by the hot melt method is disclosed in PTL 1, for example. In the method for producing the prepreg of PTL 1, the matrix resin is applied to each surface of the fibrous base material.

FIG. 1A is an explanatory view illustrating a first step of a method for producing a prepreg 52 by a conventional hot melt method.

The first step is a step of applying a matrix resin 55 onto a release paper sheet or release film 53 in the shape of a thin film, and then covering the matrix resin 55 with another release paper sheet or release film 53 to create a resin film 50. The resin film 50 has a configuration in which two release paper sheets or release films 53 hold the matrix resin 55 therebetween and is wound around a roll 56. The film thickness of the resin film 50 is adjusted according to the required amount of the matrix resin 55 in the prepreg 52.

FIG. 1B is an explanatory view illustrating a second step of the method for producing the prepreg 52 by the conventional hot melt method.

In the method for producing the prepreg 52 disclosed in PTL 1, a fibrous base material 54 is impregnated with the matrix resin 55 from both surfaces thereof as illustrated in FIG. 1B.

The second step of PTL 1 uses two rolls of the resin film 50 created in the first step.

In the second step, the release paper sheets or release films 53 on the side facing the fibrous base material 54 of the two rolls of the resin films 50 are first peeled off, and then the fibrous base material 54 is held and stuck between the resin films 50. Thereafter, the resultant substance is heated on a hot plate 61 to reduce the viscosity of the matrix resin 55. By subsequent heating and pressurization with rollers 62, the fibrous base material 54 is impregnated with the matrix resin 55 to complete the prepreg 52.

CITATION LIST

Patent Literature

PTL 1: International Publication WO 2010/150022

SUMMARY OF INVENTION

Technical Problem

As described above, the method for producing the prepreg 52 by the conventional hot melt method has required the two steps of the first step of producing the resin film 50 and the second step of impregnating the fibrous base material 54 with the matrix resin 55 of the resin film 50, and thus the productivity has not been good.

When a low viscosity resin is used for the conventional hot melt method, the resin cannot be left on only one release paper sheet or release film 53 in peeling off the resin from the release paper sheet or release films 53 in the second step, so that the film thickness is not fixed. Therefore, the conventional hot melt method has not been applicable to the impregnation of the fibrous base material 54 with the low viscosity resin.

The present invention has been conceived in order to solve the above-described problems. More specifically, it is an object of the present invention to provide a prepreg continuous production device and a method therefor by a hot melt method not requiring a step of creating a resin film and usable even for a low viscosity resin.

Solution to Problem

The present invention provides a prepreg continuous production device including:
  a pair of heating rollers adjacent to each other and rotating around the axes of rotation extending horizontally and parallel to each other;
  a pair of release sheet reels capable of unwinding release sheets toward the peripheral surfaces of the pair of heating rollers;
  a cloth reel capable of unwinding cloth in between the pair of release sheets;
  and a resin supply device supplying a matrix resin to be accumulated above a gap portion positioned in a clearance of the pair of heating rollers and between the pair of release sheets, in which
  the heating rollers each rotate such that the peripheral surfaces of the heating rollers in the gap portion move from above to below and extrude, in the downward direction, the release sheets, the cloth, and the matrix resin passing through the gap portion from above to below in an overlaid state, and
  the adhesion amount of the matrix resin adhering to the cloth is controlled by varying the interval of the pair of heating rollers.

The present invention also provides a prepreg continuous production method, the prepreg in which a matrix resin adheres to cloth, including:
  arranging a release sheet on each surface of the cloth;
  passing the cloth and a pair of the release sheets through a gap portion positioned in a clearance of a pair of heating rollers to be overlaid on each other and supplying the matrix resin to be accumulated above the gap portion of the heating rollers and between the pair of release sheets; and adjusting the interval of the pair of heating rollers to thereby control the adhesion amount of the matrix resin.

Advantageous Effects of Invention

According to the present invention described above, the pair of release sheets and the cloth arranged therebetween pass through the gap portion of the pair of heating rollers and the matrix resin is supplied to be accumulated above the gap portion and between the pair of release sheets. Thus, the present invention can perform the step of making the matrix resin adhere to the cloth, the adjustment of the adhesion amount of the matrix resin, and the step of overlaying the release sheet on each surface of the cloth at a time in the gap portion of the heating rollers. Therefore, the present invention can omit a step of producing a resin film, which was required in the conventional hot melt method.

Further, the present invention can produce a prepreg in continuous one step, and therefore can improve the productivity and the production workability.

Further, the present invention makes the matrix resin adhere to the cloth by immersing the cloth in the matrix resin accumulated above the gap portion. Therefore, the present invention can use, for the production of the prepreg, even the matrix resin which has been incapable of producing a resin film due to its low viscosity at room temperature or a low temperature and unsuitable for the conventional hot melt method.

DESCRIPTION OF EMBODIMENTS

Figure 1A:
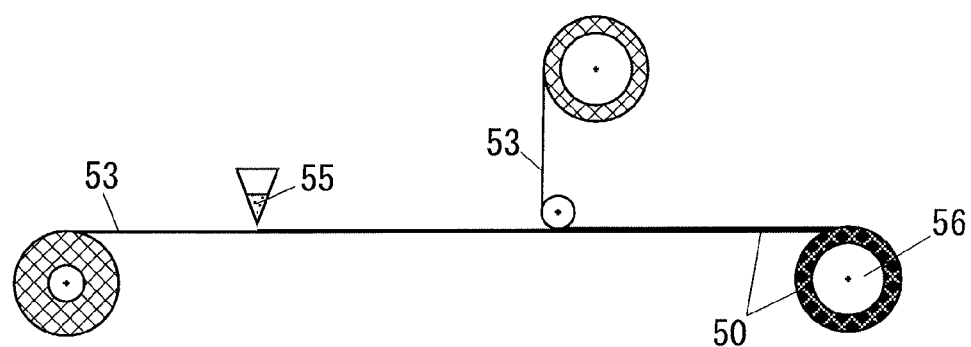
FIG. 1A is an explanatory view illustrating a first step of a method for producing a prepreg by a conventional hot melt method.
Figure 1B:
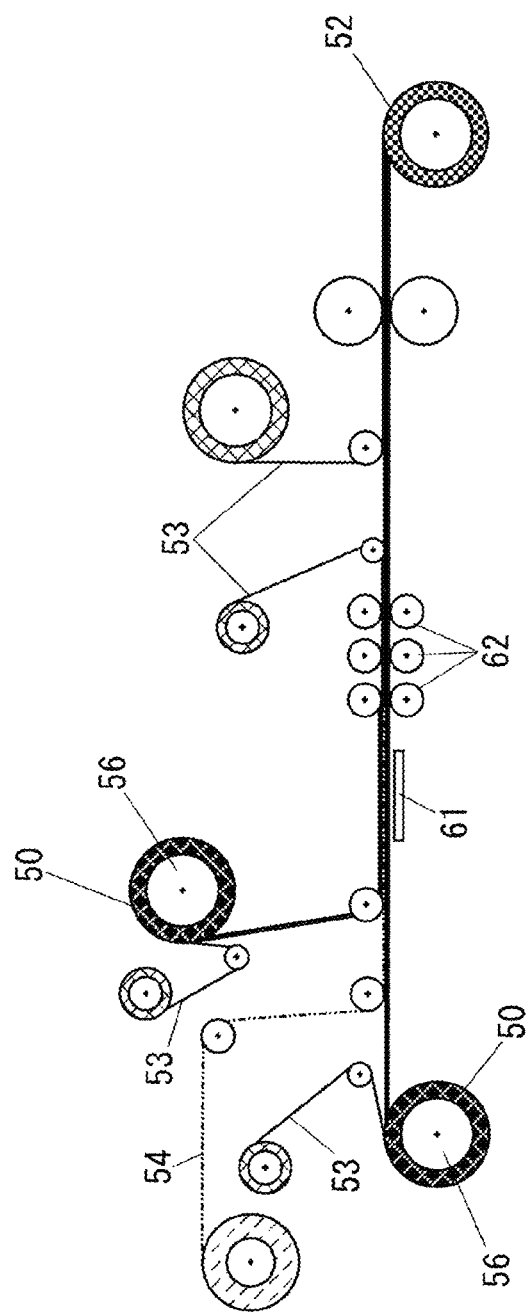
FIG. 1B is an explanatory view illustrating a second step of the method for producing a prepreg by the conventional hot melt method.

Hereinafter, embodiments of the present invention are described based on the drawings. The same signs are attached to common parts in the drawings and duplicate descriptions are omitted.

First Embodiment

Figure 2:
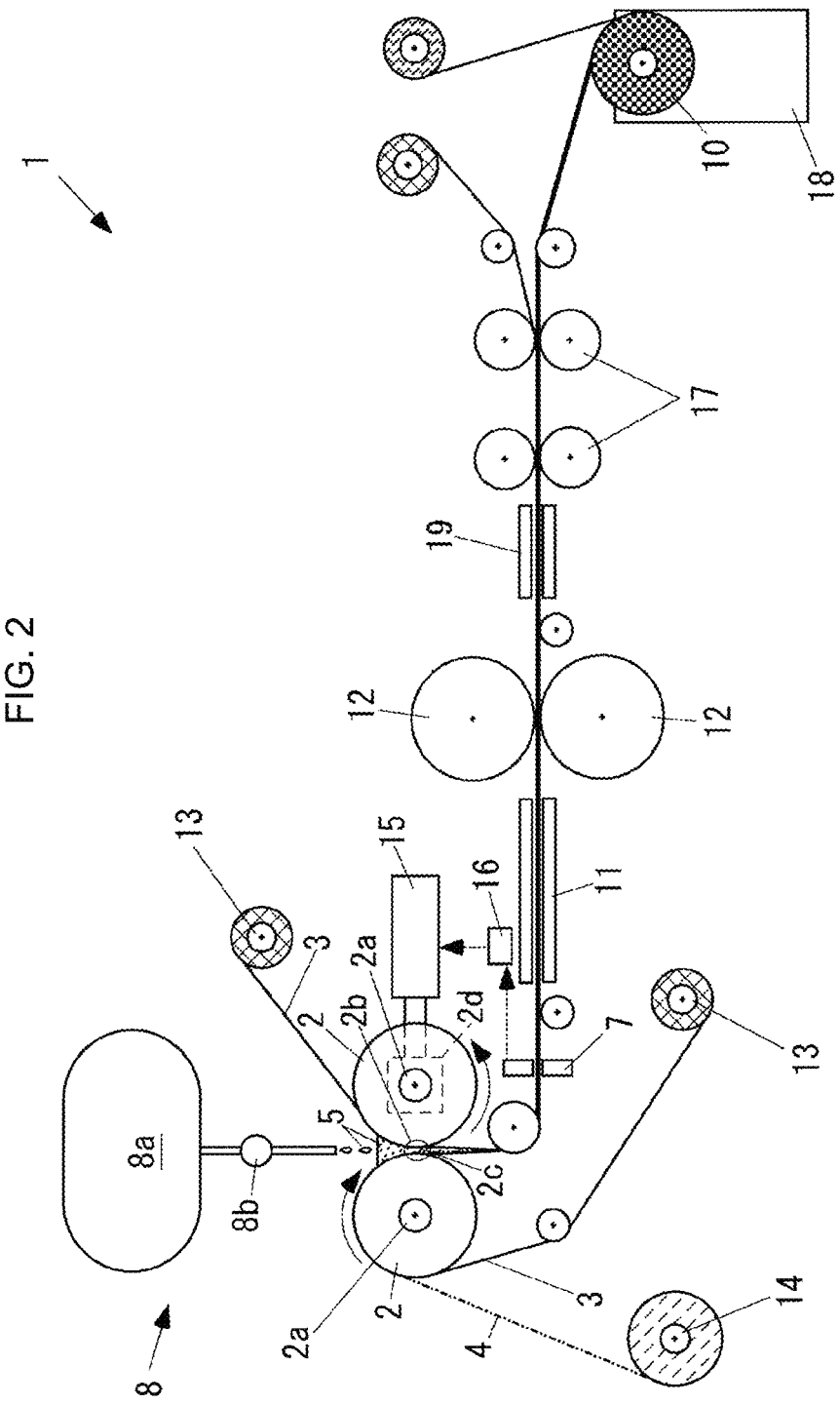
FIG. 2 is an explanatory view of a prepreg continuous production device of a first embodiment.

FIG. 2 is an explanatory view of a prepreg continuous production device 1 of a first embodiment. This embodiment is an embodiment of making a matrix resin 5 adhere to one surface of cloth 4.

The prepreg continuous production device 1 (hereinafter referred to as "continuous production device 1") is a device of producing a prepreg 10 in continuous one step of a hot melt method using a matrix resin 5. The continuous production device 1 includes a pair of heating rollers 2, a pair of release sheet reels 13, a cloth reel 14, and a resin supply device 8.

When using the continuous production device 1, two release sheets 3, the cloth 4, and the matrix resin 5 are charged into a gap portion 2b positioned in a clearance between the pair of heating rollers 2. Thus, the continuous production device 1 can produce one in which the matrix resin 5 adheres to the cloth 4 and each surface thereof is covered with the release sheet 3 at a time.

The matrix resin 5 is a thermosetting resin or a thermoplastic resin or a mixture thereof and has a characteristic that the viscosity decreases when heated once. The matrix resin 5 of this embodiment is preferably a solvent-free resin, but may be a matrix resin containing a solvent, depending on the requirements of the prepreg 10. The matrix resin 5 is first charged into the gap portion 2b between the pair of heating rollers 2.

The pair of heating rollers 2 are adjacent to each other and form one set and rotate around axes of rotation 2a extending horizontally and parallel to each other. A pair of release sheets 3 and the cloth 4 are placed over peripheral surfaces 2c of the heating rollers 2 from above to below through the gap portion 2b. The resin supply device 8 charges the matrix resin 5 between the release sheets 3 and the cloth 4.

At this time, the resin supply device 8 supplies the matrix resin 5 to be accumulated above the gap portion 2b and between the pair of release sheets 3. For example, the resin supply device 8 may be a resin tank 8a and a pump 8b as illustrated in this figure. In this case, the matrix resin 5 is transferred from the resin tank 8a by the pump 8b or the like to be charged into the gap portion 2b.

When each of the heating rollers 2 rotates such that the peripheral surface 2c of the heating roller 2 in the gap portion 2b moves from above to below, the release sheets 3, the cloth 4, and the matrix resin 5 pass through the gap portion 2b from above to below and are extruded from the lower side while being overlaid on each other. At this time, the viscosity of the matrix resin 5 above the gap portion 2b is preferably 0.5 Pa·s or more and 100 Pa·s or less. This is because, when the viscosity of the matrix resin 5 above the gap portion 2b is less than 0.5 Pa·s, the matrix resin 5 tends to flow downward in the vertical direction from the gap portion 2b through the cloth 4, making it difficult to control the progress speed of the production line and adjust the adhesion amount of the matrix resin 5.

For example, it is preferable that the heating rollers 2 in the case of using the matrix resin 5 having a high viscosity at room temperature or a low temperature can heat the matrix resin 5 until the viscosity of the matrix resin 5 reaches 0.5 Pa·s or more and 100 Pa·s or less.

At this time, the viscosity of the matrix resin 5 above the gap portion 2b is particularly preferably 0.5 Pa·s or more and 10 Pa·s or less. The viscosity of the matrix resin 5 above the gap portion 2b is particularly preferably 10 Pa·s or less, because, when the viscosity is larger than 10 Pa·s, it takes time to feed the matrix resin 5 downward by the heating rollers 2, decreasing the productivity of the prepreg 10.

The heating rollers 2 are also preferably configured to be able to control the distance of a clearance of the gap portion 2b. For example, the heating rollers 2 may have an actuator 15 moving one heating roller 2 horizontally toward the other heating roller 2 together with a motor 2d rotating the axis of rotation 2a of one heating roller 2. It is preferable that a control device 16 is connected to the actuator 15 and the control device 16 drives the actuator 15 to adjust the distance of the clearance of the gap portion 2b. The actuator 15 is not limited to the configuration illustrated in this figure and may also be provided in the heating roller 2 around which the cloth 4 is wound or may be provided in both the heating rollers 2. The heating roller 2 around which the cloth 4 is wound may be either the right or left heating roller 2 in this figure.

The release sheet reels 13 are devices capable of unwinding the release sheets 3 toward the peripheral surfaces 2c of the pair of heating rollers 2. One release sheet reel 13 is provided for one heating roller 2, forming one pair in total. It is preferable that the release sheet reels 13 have a braking mechanism of stopping the rotation of the release sheets 3 in addition to the unwinding of the release sheets 3 by generating back tension in the release sheets 3.

The release sheets 3 are film-like artifacts which are used to hold the cloth 4 and the matrix resin 5 from both surfaces. In the continuous production device 1, a pair of release sheets 3 (2 rolls) is used. As illustrated in this figure, one release sheet 3 is arranged for one heating roller 2 and passes up to down through the gap portion 2b of the heating roller 2.

The release sheets 3 may be, for example, release films or release paper sheets. It is preferable to properly use the release film or the release paper sheet depending on the temperature of the heating rollers 2 or hot plates 11 in producing the prepreg 10 or the releasability from a material.

The cloth reel 14 is a device capable of unwinding the cloth 4 in between the pair of release sheets 3. It is preferable that the cloth reel 14 also has a braking mechanism of stopping the rotation of the cloth 4 in addition to the unwinding of the cloth 4 by generating back tension in the cloth 4.

The cloth 4 of this embodiment may be a fibrous base material obtained by entangling fibers containing inorganic materials, such as carbon fibers or glass fibers, or organic fibers, such as aramid fibers, nylon fibers, or polyester fibers, with each other to form a sheet. The cloth 4 may be various woven fabrics, Non-Crimp Fabrics (NCF), knitted fabrics, or non-woven fabrics, such as compressed wool or felt cloth, and does not include those in which fibers are oriented and aligned in one direction. The continuous production device 1 of this embodiment is installed such that the cloth 4 is wound around a part of the peripheral surface 2c of one heating roller 2 with one release sheet 3 interposed therebetween. Thus, the continuous production device 1 can make the matrix resin 5 adhere only to one surface of the cloth 4.

With this configuration, the cloth 4 having one surface to which the matrix resin 5 adheres and held between the pair of release sheets 3 from the outside is extruded from the lower side of the gap portion 2b of the heating rollers 2. At this time, a sheet extruded from the gap portion 2b is in a state where the pair of release sheets 3 and the cloth 4 having one surface to which the matrix resin 5 adheres are overlaid on each other.

As described above, the continuous production device 1 accumulates the matrix resin 5 above the gap portion 2b covered with the pair of release sheets 3. By passing the cloth 4 up to down through the gap portion 2b while immersing the cloth 4 in the accumulated matrix resin 5, the matrix resin 5 is made to adhere to the cloth 4.

Due to the configuration of the continuous production device 1 in which the matrix resin 5 is accumulated in the gap portion 2b between the two heating rollers 2 and passing the cloth 4 through the matrix resin 5, the rotation of the heating rollers 2 can forcibly and positively promote the impregnation of the cloth 4 with the matrix resin 5, as compared with a case of simply passing the cloth 4 through the matrix resin 5 accumulated in a container.

Further, this configuration can supply the release sheets 3 to the gap portion 2b by rotating the heating rollers 2, (1) following the progress speed of the production line, (2) along the two heating rollers 2, and (3) under tension. As a result, the gap portion 2b does not need to be cleaned, and therefore the maintainability is more excellent than that in the case of simply passing the cloth 4 through the matrix resin 5 accumulated in a container.

In addition thereto, when the cloth 4 is simply passed through the matrix resin 5 accumulated in a container, the adhesion amount of the matrix resin 5 cannot be adjusted, whereas the continuous production device 1 of this embodiment can easily adjust the adhesion amount of the matrix resin 5 because the adhesion amount of the matrix resin 5 is adjusted by the width of the roller gap of the heating rollers 2 (interval 6 of the gap portion 2b (see FIG. 3A)).

On the downstream side of the pair of heating rollers 2, thickness gauges 7 are preferably provided. The thickness gauges 7 are preferably, for example, X-ray thickness gauges or β-ray thickness gauges.

For example, it may be acceptable that the thickness gauges 7 are arranged immediately behind the heating rollers 2 and hold the sheet extruded from the gap portion 2b therebetween between the top and bottom, and one thickness gauge 7 emits X-rays or β-rays and the other thickness gauge 7 receives the X-rays or the β-rays. In that case, the thickness gauge 7 may be one measuring the mass per unit area from the attenuation of the X-rays or the β-rays transmitting through a measurement target, and multiplying the mass by the density, thereby calculating the thickness of the measurement target, for example. Thus, the thickness gauges 7 measure the mass per unit area in a state where the two release sheets 3, the cloth 4, and the matrix resin 5 are overlaid on each other.

When the thickness gauges 7 transmit information on the acquired thickness of the measurement target to the control device 16, the control device 16 acquires the adhesion amount of the matrix resin 5 by treating the mass obtained from the attenuation of the X-rays or the β-rays in the two release sheets 3 and the cloth 4 as a constant. The control device 16 feeds back the calculated adhesion amount of the matrix resin 5 to the interval 6 of the gap portion 2b of the heating rollers 2, so that continuous production device 1 controls the adhesion amount of the matrix resin 5.

The adjustment of the interval 6 of the pair of heating rollers 2 based on a measured value of the thickness gauges 7 may be manually performed.

As described above, the continuous production device 1 can adjust the interval 6 of the pair of heating rollers 2 based on the measured value of the thickness gauges 7 manually, or automatically with the control device 16.

In order to sufficiently impregnate the cloth 4 with the matrix resin 5, the continuous production device 1 is preferably provided with the hot plates 11, impregnation rollers 12, cooling plates 19, drive rollers 17, and a winding device 18 on the downstream side of the heating rollers 2.

The hot plates 11 are plates for heating to reduce the viscosity of the matrix resin 5 adhering to the cloth 4 once. During the passage of the cloth 4 held between the release sheets 3 between the hot plates 11 provided up and down, the matrix resin 5 is heated, so that the viscosity is reduced. This is the preparation for the impregnation of the cloth 4 with the matrix resin 5 by the impregnation rollers 12.

The impregnation rollers 12 contain a pair of pressurization rollers capable of performing either or both of pressurization and heating of the cloth 4 to which the matrix resin 5 adheres. Thus, the cloth 4 can be impregnated with the matrix resin 5 adhering to the surface of the cloth 4 to the inside thereof, forming a uniform prepreg 10.

The prepreg 10 is an intermediate material to be used in producing plastic products, such as FRP, and therefore, in the case of a thermosetting resin, the matrix resin 5 of the prepreg 10 is preferably in a semi-cured state in terms of workability in lamination. The cooling plates 19 contain a pair of cooling plates arranged up and down and are used to cool the heated prepreg 10 by passing it between the upper and lower cooling plates 19. Thus, the heated matrix resin 5 can be cooled, so that the progress of a curing reaction can be suppressed.

The drive rollers 17 contain a pair of rollers and hold the prepreg 10 therebetween and move it at a constant speed.

The winding device 18 is a device of winding the completed prepreg 10 onto a paper tube. The winding device 18 is preferably provided with a function of aligning end portions with an EPC sensor or the like.

Figure 3A:
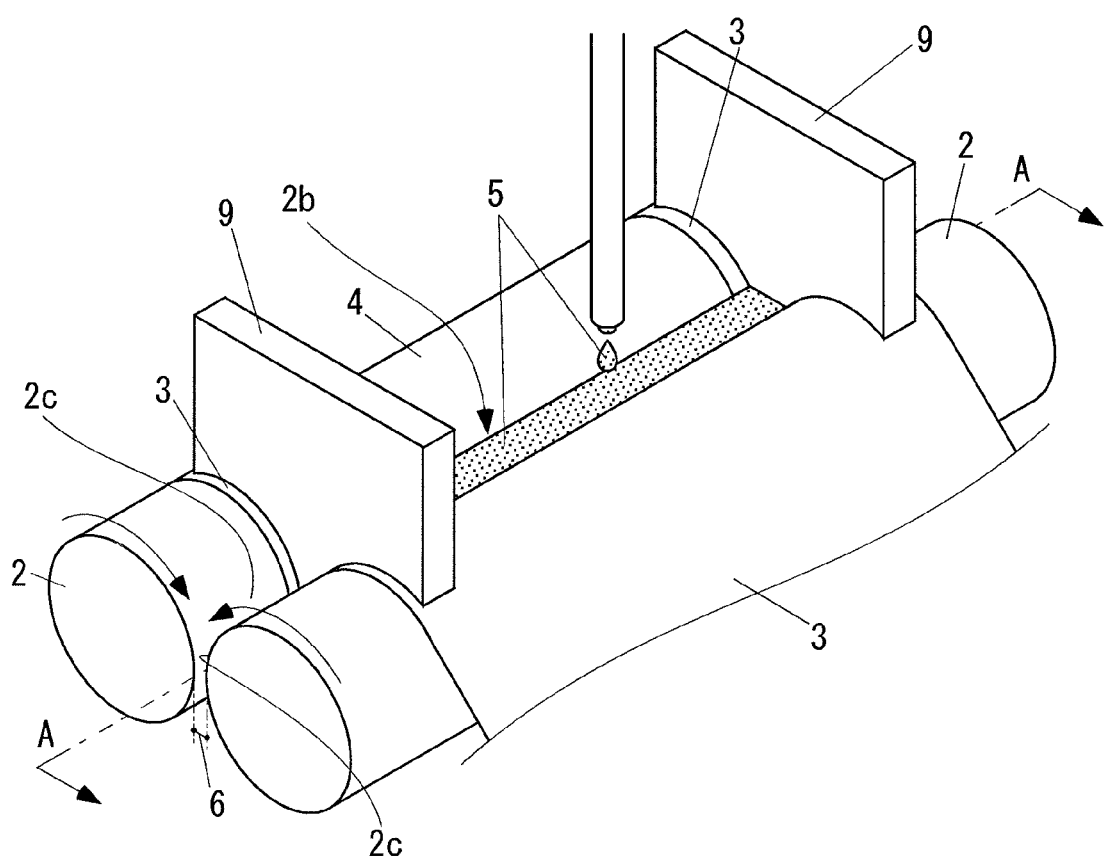
FIG. 3A is a perspective view of heating rollers of the first embodiment.
Figure 3B:
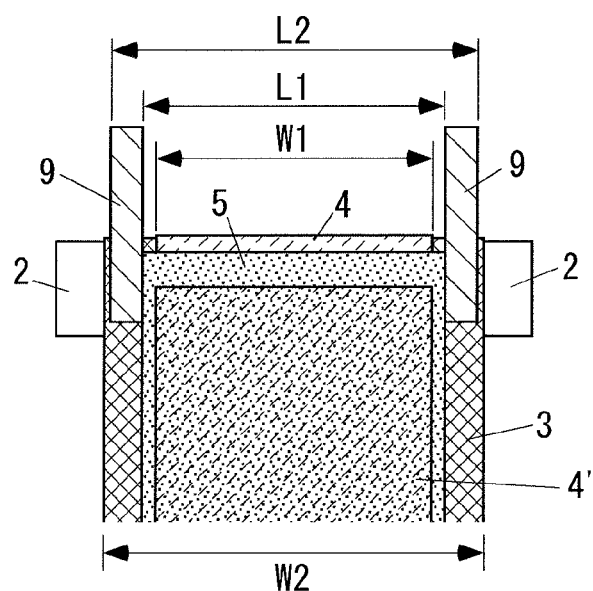
FIG. 3B is a cross-sectional view along the A-A line of FIG. 3A.

FIG. 3A is a perspective view of the heating rollers 2 of the first embodiment. FIG. 3B is a cross-sectional view along the A-A line of FIG. 3A. The reference sign "4'" in FIG. 3B designates cloth 4' to which the matrix resin 5 adheres.

As illustrated in this figure, guides 9 provided following the shape of the heating rollers 2 are preferably provided in the gap portion 2b at both end portions of the adhesion range of the matrix resin 5 in the axial direction of the heating rollers 2. Thus, the adhesion range of the matrix resin 5 can be limited to a range between both the guides 9.

At this time, when L1 is set as the distance between the insides of the pair of guides 9, L2 is set as the distance between the outsides of the guides 9, W1 is set as the widths of the cloths 4, 4', and W2 is set as the width of the release sheet 3, the following equations 1 and 2 are preferably established. By satisfying Equation 1, the cloth 4 can be surely prevented from being folded by the guides 9 and held between the release sheets 3, and therefore the matrix resin 5 can be uniformly made to adhere to the cloth 4 in the width direction. Further, by satisfying Equation 2, the matrix resin 5 is surely held between the release sheets 3, and therefore the adhesion of the matrix resin 5 to the heating rollers 2 can be prevented.

$$L1 > W1 \quad \text{(Equation 1)}$$

$$L2 \leq W2 \quad \text{(Equation 2)}$$

As described in FIG. 2, the pair of heating rollers 2 is provided such that the interval 6 therebetween is adjustable. Thus, the adhesion amount of the matrix resin 5 adhering to the cloth 4 can be controlled by varying the interval 6 of the pair of heating rollers 2.

The continuous production device 1 of this embodiment can perform the step of making the matrix resin 5 adhere to the cloth 4, the adjustment of the adhesion amount of the matrix resin 5, and the step of overlaying the release sheet 3 on each surface of the cloth 4 at a time in the gap portion 2b of the heating rollers 2 by the above-described configuration. Therefore, the continuous production device 1 of this embodiment can omit the step of producing the resin film 50, which was required in the conventional hot melt method.

Further, the prepreg 10 can be produced by continuously performing the adhesion step and the impregnation step of the matrix resin 5, and therefore the productivity and the production workability can be improved.

Further, the continuous production device 1 accumulates the matrix resin 5 in a space enclosed by the release sheets 3 and the guides 9, and continuously hold the matrix resin 5 as it is between the release sheets 3, and therefore no resin adheres onto the production line, achieving excellent maintainability.

Further, the continuous production device 1 makes the matrix resin 5 adhere to the cloth 4 by immersing the cloth 4 in the matrix resin 5 accumulated above the gap portion 2b. Therefore, the continuous production device 1 of this embodiment can use, for the production of the prepreg 10, even the matrix resin 5 which has been incapable of producing the resin film 50 due to its low viscosity at room temperature (e.g., 15 to 25° C.) or a low temperature (e.g., 0° C. or more and less than 15° C.) and unsuitable for the conventional hot melt method.

Further, in the case of the matrix resin 5 having a high viscosity at room temperature or a low temperature, the continuous production device 1 of this embodiment can reduce the viscosity by heating the matrix resin 5 with the two heating rollers 2. Therefore, the continuous production device 1 of this embodiment is also applicable to a resin having a high viscosity at room temperature or a low temperature.

Further, the continuous production device 1 is provided with the thickness gauges 7, and therefore can control the adhesion amount (resin content) of the matrix resin 5 by adjusting the interval 6 of the gap portion 2b according to a measured value of the thickness gauges 7.

Further, the prepreg 10 is always passed through the thickness gauges 7 over the entire length of the prepreg 10, and therefore the resin content over the entire roll of the prepreg 10 can be measured.

Next, a prepreg continuous production method in this embodiment is described.

As illustrated in FIG. 2, the release sheet 3 is placed on each surface of the cloth 4, and the cloth 4 and the pair of release sheets 3 are passed through the gap portion 2b positioned in a clearance of the pair of heating rollers 2 to be overlaid on each other. In addition thereto, the matrix resin 5 is supplied between the cloth 4 and the release sheet 3 in the gap portion 2b of the heating rollers 2.

In this embodiment, the cloth 4 is passed through the gap portion 2b in a state of being overlaid and wound on the release sheet 3 wound around the peripheral surface 2c of one heating roller 2, thereby making the matrix resin 5 adhere to one surface of the cloth 4. The adhesion amount of the matrix resin 5 is controlled by the interval 6 of the gap portion 2b.

On the downstream side of the pair heating rollers 2, the thickness gauges 7 are installed and the interval 6 of the pair heating rollers 2 is adjusted based on a measured value of the thickness gauges 7.

Thus, the measured value of the thickness gauges 7 can be fed back to the interval 6 of the gap portion 2b.

The effects of the prepreg continuous production method of this embodiment are the same as the effects of the continuous production device 1 of this embodiment.

Second Embodiment

Figure 4:
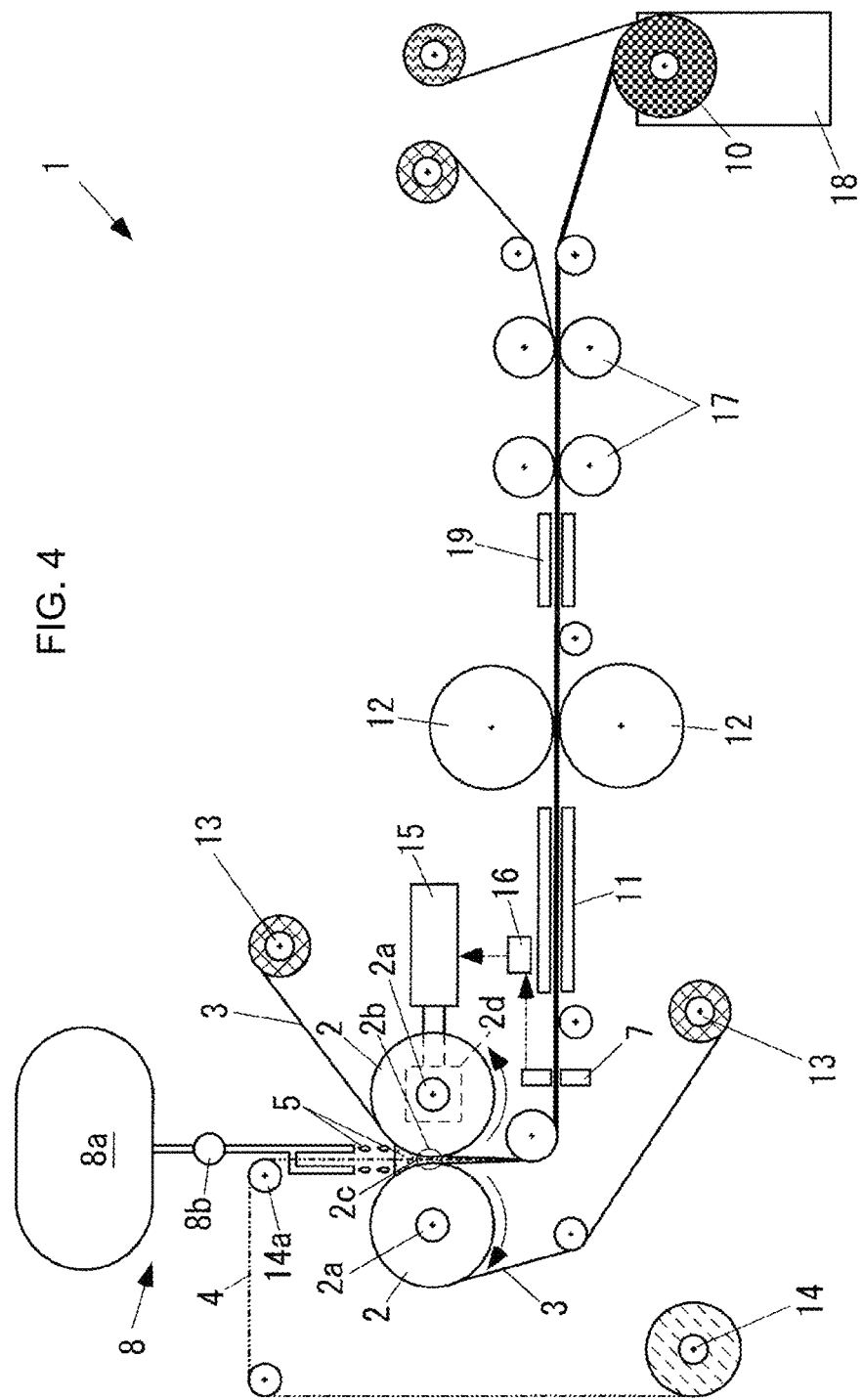
FIG. 4 is an explanatory view of a prepreg continuous production device of a second embodiment.

FIG. 4 is an explanatory view of the continuous production device 1 of a second embodiment. The continuous production device 1 of this embodiment has an embodiment of making the matrix resin 5 adhere to the cloth 4 from both surfaces of the cloth 4. Therefore, the continuous production device 1 is different from that of the first embodiment in the angle when the cloth 4 enters the gap portion 2*b*.

Specifically, the continuous production device 1 of this embodiment is provided with a base material roller 14*a* of fixing a route in which the cloth 4 extends toward the gap portion 2*b* at an angle at which a clearance is generated between the cloth 4 and each release sheet 3 in the matrix resin 5 accumulated above the gap portion 2*b*. In this point, the continuous production device 1 of this embodiment is different from that of the first embodiment. Thus, the cloth 4 passes up to down through the gap portion 2*b* between the pair of release sheets 3 without being wound around one heating roller 2. The cloth 4 passing through the gap portion 2*b* preferably vertically extends. This creates a clearance between each release sheet 3 and the cloth 4, and the matrix resin 5 enters the clearance, and therefore the matrix resin 5 can be made to adhere to each surface of the cloth 4 at a time. Then, one in which the release sheet 3 is stuck to the matrix resin 5 on each surface of the cloth 4 is extruded from the lower side of the gap portion 2*b*.

Thus, the continuous production device 1 of this embodiment can make the matrix resin 5 adhere to each surface of the cloth 4 at a time.

In the case of the matrix resin 5 of a high viscosity type, it is sometimes difficult to impregnate the cloth 4 with the matrix resin 5 to the rear surface side thereof even when the matrix resin 5 is supplied only to one surface. Even when the matrix resin 5 of such a high viscosity type is used, the continuous production device 1 of this embodiment can obtain a good prepreg 10 in which the cloth 4 is sufficiently impregnated with the matrix resin 5 to the inside thereof. This is considered to be because the impregnation with the matrix resin 5 from both surfaces of the cloth 4 halves the distance in the thickness direction of the cloth 4 in which the matrix resin 5 needs to move.

Figure 5:
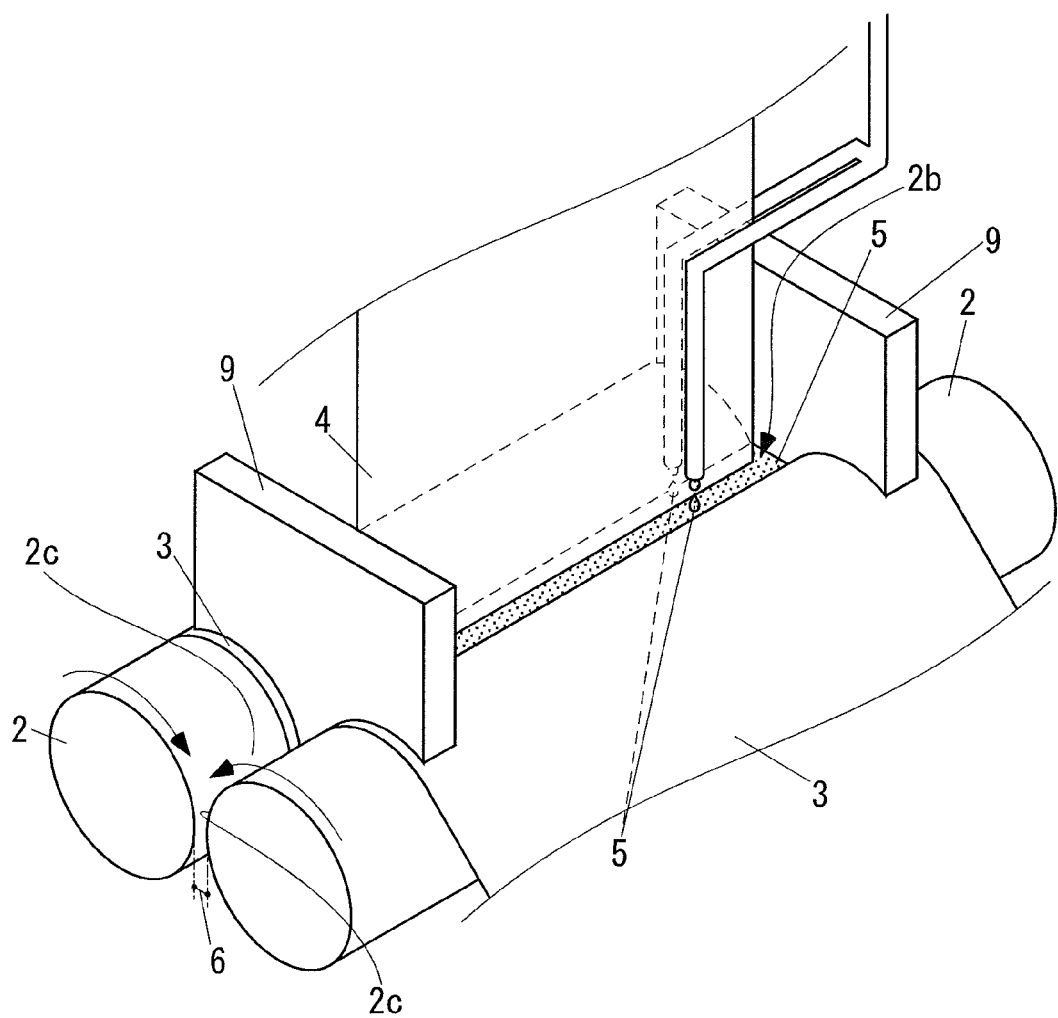
FIG. 5 is a perspective view of heating rollers of the second embodiment.

FIG. 5 is a perspective view of the heating rollers 2 of the second embodiment. When the matrix resin 5 is charged between each of the pair of release sheets 3 and the cloth 4, the resin supply device 8 of this embodiment preferably charges the matrix resin 5 into each of both the front surface side and the rear surface side of the cloth 4 as illustrated in this figure. Thus, even when the viscosity of the matrix resin 5 is high, the matrix resin 5 can be made to adhere to the cloth 4 from the front surface side and the rear surface side of the cloth 4, resulting in that the cloth 4 can be impregnated with the matrix resin 5 to the inside thereof with the impregnation rollers 12 positioned on the downstream side.

The other configurations and effects of the continuous production device 1 of this embodiment are the same as those in the first embodiment.

Further, the prepreg continuous production method in this embodiment includes passing the cloth 4 through the gap portion 2*b* such that a clearance is generated between the cloth 4 and each release sheet 3 in the matrix resin 5 accumulated above the gap portion 2*b*. Thus, the matrix resin 5 can be made to adhere to each surface of the cloth 4.

The other effects of the prepreg continuous production method of this embodiment are the same as those in the first embodiment.

Thus, the continuous production device 1 can make resin adhere to the cloth 4 from one surface or both surfaces by changing the route in which the cloth 4 to be passed through the heating rollers 2 extends, depending on the viscosity of the matrix resin 5.

Next, examples of the prepreg continuous production device 1 are described.

1. Low Viscosity Epoxy Resin

Example 1-1

In the continuous production device 1 of this example, a non-crimp fabric was used as the cloth 4, a release film was used as the release sheet 3, and a low viscosity epoxy resin was used as the matrix resin 5.

A non-crimp fabric with fiber areal weight (FAW) of 900 $g/m^2$ in which the orientation angles of carbon fibers were +45°/90°/−45° and a stitch yarn was woven, an epoxy resin with a room temperature viscosity of 9 Pa·s, and an embossed release film containing a polyethylene material were used. The heating rollers 2, the hot plates 11, and the impregnation rollers 12 were set to 25° C., and the matrix resin 5 was made to adhere to the cloth 4 on the heating rollers 2 from one surface side as illustrated in FIG. 2.

As a result of producing the prepreg 10 by controlling the interval 6 of the gap portion 2*b* between the heating rollers 2 such that the resin content was 36±2 wt % with the thickness gauges 7, the prepreg 10 impregnated with the matrix resin 5 from the supply surface of the matrix resin 5 to the rear surface of the cloth 4 was obtained.

Example 1-2

In the continuous production device 1 of this example, a non-crimp fabric was used as the cloth 4, a release film was used as the release sheet 3, and a low viscosity epoxy resin was used as the matrix resin 5.

A non-crimp fabric with fiber areal weight (FAW) of 450 $g/m^2$ in which the orientation angles of carbon fibers were +45°/90°/−45° and a stitch yarn was woven, an epoxy resin with a room temperature viscosity of 9 Pa·s, and an embossed release film containing a polyethylene material were used. The heating rollers 2, the hot plates 11, and the impregnation rollers 12 were set to 25° C., and the matrix resin 5 was made to adhere to the cloth 4 on the heating rollers 2 from one surface side as illustrated in FIG. 2.

As a result of producing the prepreg 10 by controlling the interval 6 of the gap portion 2*b* between the heating rollers 2 such that the resin content was 36±2 wt % with the thickness gauges 7, the prepreg 10 impregnated with the matrix resin 5 from the supply surface of the matrix resin 5 to the rear surface of the cloth 4 was obtained.

2. High Viscosity Epoxy Resin (Epoxy Resin Composition)

Example 2-1

In the continuous production device 1 of this example, a non-crimp fabric was used as the cloth 4, a release paper sheet was used as the release sheet 3, and a high viscosity epoxy resin composition was used as the matrix resin 5.

A non-crimp fabric with fiber areal weight (FAW) of 530 $g/m^2$ in which the orientation angles of carbon fibers were +45°/−45° and a stitch yarn was woven, an epoxy resin composition with a viscosity at room temperature of 100,000 Pa·s and a viscosity at 80° C. of 5 Pa·s, and a release paper sheet were used. By setting the heating rollers 2, the hot plates 11, and the impregnation rollers 12 to 80° C., the viscosity of the matrix resin 5 was reduced, and the matrix resin 5 was made to adhere to the cloth 4 on the heating rollers 2 from both surface sides as illustrated in FIG. 4. As a result of producing the prepreg 10 by controlling the interval 6 of the gap portion 2*b* between the heating rollers 2 such that the resin content was 38±2 wt % with the thickness gauges 7, the prepreg 10 having the impregnation state similar to that in the case of producing the prepreg 10 by the conventional hot melt method was obtained.

Example 2-2

In the continuous production device 1 in this example, a carbon fiber woven fabric was used as the cloth 4, a release paper sheet was used as the release sheet 3, and a high viscosity epoxy resin composition was used as the matrix resin 5.

A carbon fiber plain-woven fabric with fiber areal weight (FAW) of 200 g/m², an epoxy resin composition with a viscosity at room temperature of 100,000 Pa·s and a viscosity at 80° C. of 5 Pa·s, and a release paper sheet were used. By setting the heating rollers 2, the hot plates 11, and the impregnation rollers 12 to 80° C., the viscosity of the matrix resin 5 was reduced, and the matrix resin 5 was made to adhere to the cloth 4 on the heating rollers 2 from both surface sides as illustrated in FIG. 4.

As a result of producing the prepreg 10 by controlling the interval 6 of the gap portion 2b between the heating rollers 2 such that the resin content was 38±2 wt % with the thickness gauges 7, the prepreg 10 having the impregnation state similar to that in the case of producing the prepreg 10 by the conventional hot melt method was obtained.

Example 2-3

In the continuous production device 1 in this example, an 8-harness satin woven glass cloth was used as the cloth 4, a release paper sheet was used as the release sheet 3, and a high viscosity epoxy resin composition was used as the matrix resin 5. An 8-harness satin woven glass cloth with fiber areal weight (FAW) of 300 g/m², an epoxy resin composition with a viscosity at room temperature of 100,000 Pa·s and a viscosity at 80° C. of 5 Pa·s, and a release paper sheet were used. By setting the heating rollers 2, the hot plates 11, and the impregnation rollers 12 to 80° C., the viscosity of the matrix resin 5 was reduced, and the matrix resin 5 was made to adhere to the cloth 4 on the heating rollers 2 from both surface sides as illustrated in FIG. 4.

As a result of producing the prepreg 10 by controlling the interval 6 of the gap portion 2b between the heating rollers 2 such that the resin content was 35±2 wt % with the thickness gauges 7, the prepreg 10 having the impregnation state similar to that in the case of producing the prepreg 10 by the conventional hot melt method was obtained.

According to the above-described present invention, the pair of release sheets 3 and the cloth 4 placed therebetween pass through the gap portion 2b of the pair of heating rollers 2 and the matrix resin 5 is supplied to be accumulated above the gap portion 2b and between the pair of release sheets 3. Thus, the present invention can perform the step of making the matrix resin 5 adhere to the cloth 4, the adjustment of the adhesion amount of the matrix resin 5, and the step of overlaying the release sheet 3 on each surface of the cloth 4 at a time in the gap portion 2b of the heating rollers 2. Therefore, the present invention can omit the step of producing the resin film 50, which was required in the conventional hot melt method.

Further, the present invention can produce the prepreg 10 in continuous one step, and therefore can improve the productivity and the production workability.

Further, according to the present invention, the matrix resin 5 is accumulated in the space enclosed by the release sheets 3 and the guides 9 and the matrix resin 5 is continuously held as it is between the release sheets 3, and therefore no resin adheres onto the production line, achieving excellent maintainability.

Further, according to the present invention, the matrix resin 5 is made to adhere to the cloth 4 by immersing the cloth 4 in the matrix resin 5 accumulated above the gap portion 2b. Thus, the present invention can use, for the production of the prepreg 10, even the matrix resin 5 which has been incapable of producing the resin film 50 due to its low viscosity at room temperature or a low temperature and unsuitable for the conventional hot melt method.

For the matrix resin 5 having a high viscosity at room temperature or a low temperature, the viscosity can be reduced by heating the matrix resin 5 with the two heating rollers 2, and therefore the continuous production device 1 of this embodiment is also efficiently applicable to a resin having a high viscosity at room temperature or a low temperature.

Further, the continuous production device 1 is provided with the thickness gauges 7, and therefore can automatically control the adhesion amount (resin content) of the matrix resin 5 by adjusting the interval 6 of the gap portion 2b according to a measured value of the thickness gauges 7.

Further, the prepreg 10 always passes through the thickness gauges 7, and therefore the resin content over the entire roll of the prepreg 10 can be measured.

Further, according to the present invention, the cloth 4 is immersed in the matrix resin 5 accumulated above the gap portion 2b, making the matrix resin 5 adhere to the cloth 4. Therefore, the present invention can easily switch between a production line of making the matrix resin 5 adhere to one surface of the cloth 4 and a production line of making the matrix resin 5 adhere to each surface of the cloth 4 by simply changing the route in which the cloth 4 extends when passing the cloth 4 through the heating rollers 2, depending on the viscosity of the matrix resin 5.

It is a matter of course that the present invention is not limited to the above-described embodiments and can be variously changed without departing from the gist of the present invention.

REFERENCE SIGNS LIST 1 prepreg continuous production device (continuous production device)
2 heating roller
2a axis of rotation
2b gap portion
2c peripheral surface
2d motor
3 release sheet
4, 4' cloth
5 matrix resin
6 interval
7 thickness gauge
8 resin supply device
8a resin tank
8b pump
9 guide
10 prepreg
11 hot plate
12 impregnation roller
13 release sheet reel
14 cloth reel
14a base material roller
15 actuator 16 control device
17 drive roller
18 winding device
19 cooling plate
50 resin film
52 prepreg
53 release paper sheet or release film
54 fibrous base material
55 matrix resin
56 roll
61 hot plate
62 roller

The invention claimed is:

1. A prepreg continuous production device comprising:
a pair of heating rollers adjacent to each other and rotating around axes of rotation extending horizontally and parallel to each other;
a pair of release sheet reels capable of unwinding release sheets toward peripheral surfaces of the pair of heating rollers;
a cloth reel capable of unwinding cloth in between the pair of release sheets;
a resin supply device supplying a matrix resin, which is:
a solvent-free resin, and
a thermosetting resin or a thermoplastic resin or a mixture of the thermosetting resin and the thermoplastic resin,
the resin supply device and heating rollers configured to supply the matrix resin such that the matrix resin is accumulated above a gap portion positioned in a clearance of the pair of heating rollers and between the pair of release sheets, in which the heating rollers heat the matrix resin that has accumulated above the gap portion until a viscosity of the matrix resin reaches 0.5 Pa·s or more and 10 Pa·s or less;
each heating roller rotates such that the peripheral surfaces of the heating rollers in the gap portion move from above to below and extrude, in a downward direction, the release sheets, the cloth, and the matrix resin passing through the gap portion from above to below in an overlaid state;
an actuator moving the heating roller and thereby varying a size of the gap portion;
a gauge on a downstream side of the pair of heating rollers, the gauge:
(i) emitting only one of an X-ray and ß-ray to a measurement target in which the release sheets, the cloth, and the matrix resin are overlaid on each other,
(ii) receiving the emitted ray that has transmitted through the measurement target, and
(iii) measuring mass of the measurement target per unit area, based on the received emitted ray; and
a control device calculating an adhesion amount of the matrix resin, based on the measured mass, controlling the actuator, and thereby controlling an interval of the pair of heating rollers in such a way as to adjust the adhesion amount of the matrix resin adhering to the cloth.

2. The prepreg continuous production device according to claim 1, comprising:
a base material roller fixing a route in which the cloth extends toward the gap portion at an angle at which a clearance is generated between the cloth and each of the release sheets in the matrix resin accumulated above the gap portion.

3. The prepreg continuous production device according to claim 1, comprising:
a pair of impregnation rollers positioned on the downstream side of the pair of heating rollers and performing either or both of pressurization and heating of the cloth to which the matrix resin adheres and impregnating the cloth with the matrix resin from a surface to an inside of the cloth;
a pair of drive rollers holding a prepreg in which the cloth is impregnated with the matrix resin to an inside of the cloth and moving the prepreg at a constant speed; and
a winding device winding the completed prepreg.

4. The prepreg continuous production device according to claim 1, comprising:
a pair of guides, each guide bridging across the heating rollers configured with a complementary shape that extends into the gap portion to define respective end portions of an adhesion range of the matrix resin in the axial direction of the heating rollers such that the matrix resin is accumulated in a space enclosed by the release sheets and the guides above the gap portion.

5. A prepreg continuous production method, the prepreg in which a matrix resin adheres to cloth, comprising:
providing a prepreg continuous production device according to claim 1 including release sheets on the release sheet reels, cloth on the cloth reel and matrix resin in the resin supply device;
passing the cloth and the pair of the release sheets through the gap portion positioned in the clearance of the pair of heating rollers to be overlaid on each other and supplying the matrix resin to be accumulated above the gap portion of the heating rollers and between the pair of release sheets; and
adjusting the interval of the pair of heating rollers to thereby control an adhesion amount of the matrix resin.

6. The prepreg continuous production method according to claim 5 comprising:
adjusting the interval of the pair of heating rollers based on a measured value of the gauge.

7. The prepreg continuous production method according to claim 5 comprising:
passing the cloth through the gap portion such that a clearance is generated between the cloth and each of the release sheets in the matrix resin accumulated above the gap portion, and making the matrix resin adhere to each surface of the cloth.

8. The prepreg continuous production method according to claim 5 comprising:
passing the cloth through the gap portion in a state of being overlaid and wound on the release sheet wound around a peripheral surface of one of the heating rollers, and making the matrix resin adhere to one surface of the cloth.

9. The prepreg continuous production method according to claim 5, wherein
a viscosity of the matrix resin above the gap portion is 0.5 Pa·s or more and 10 Pa·s or less.

* * * * *